United States Patent
Mueller

(10) Patent No.: US 10,875,524 B2
(45) Date of Patent: Dec. 29, 2020

(54) METHOD FOR OPERATING A TRANSVERSAL GUIDANCE SYSTEM OF A MOTOR VEHICLE, AND MOTOR VEHICLE

(71) Applicant: AUDI AG, Ingolstadt (DE)

(72) Inventor: Christoph Mueller, Vienna (AT)

(73) Assignee: AUDI AG, Ingolstadt (DE)

( * ) Notice: Subject to any disclaimer, the term of this patent is extended or adjusted under 35 U.S.C. 154(b) by 331 days.

(21) Appl. No.: 15/571,383

(22) PCT Filed: Mar. 11, 2016

(86) PCT No.: PCT/EP2016/000438
§ 371 (c)(1),
(2) Date: Nov. 2, 2017

(87) PCT Pub. No.: WO2016/180507
PCT Pub. Date: Nov. 17, 2016

(65) Prior Publication Data
US 2018/0304883 A1 Oct. 25, 2018

(30) Foreign Application Priority Data

May 8, 2015 (DE) .................... 10 2015 005 975

(51) Int. Cl.
*B60W 30/02* (2012.01)
*B60T 8/1755* (2006.01)
(Continued)

(52) U.S. Cl.
CPC ............... *B60W 30/02* (2013.01); *B60T 7/12* (2013.01); *B60T 8/17557* (2013.01);
(Continued)

(58) Field of Classification Search
CPC ... B60W 30/02; B60W 30/04; B60W 2030/43
See application file for complete search history.

(56) References Cited

U.S. PATENT DOCUMENTS 7,227,454 B2 6/2007 Braeuchle et al.
7,433,769 B2 * 10/2008 Tange ................. B60T 8/17557
701/301

(Continued)

FOREIGN PATENT DOCUMENTS

CN 102632886 A 8/2012
DE 10142366 A1 3/2003
(Continued)

OTHER PUBLICATIONS

International Search Report and Written Opinion of the International Searching Authority, directed to related International Patent Application No. PCT/EP2016/000438, dated May 13, 2016, with attached English-language translation; 23 pages.

(Continued)

*Primary Examiner* — Imran K Mustafa
(74) *Attorney, Agent, or Firm* — Sterne, Kessler, Goldstein & Fox P.L.L.C.

(57) ABSTRACT

The invention elates to a method for operating a transversal guidance system of a motor vehicle through two independent channels to perform automatic transversal guidance interventions. Through the first channel, transversal interventions are performed via a first transversal guidance actuator controlled by means of a driver-operated steering handle. Through the second channel, a vehicle system sets a target, roll angle, and a second transversal guidance actuator is controlled by a transversal guidance system that performs a transversal guidance intervention based on the roll angle. The vehicle system displays the roll angle as a notification to the driver of the transversal guidance intervention. The invention also relates to a motor vehicle configured to perform the method.

20 Claims, 1 Drawing Sheet

(51) Int. Cl.
  *B60W 10/20* (2006.01)
  *B60W 50/14* (2020.01)
  *B62D 6/00* (2006.01)
  *B60T 7/12* (2006.01)
  *B62D 15/02* (2006.01)
  *B60W 10/18* (2012.01)
  *B60W 10/184* (2012.01)
  *G05D 1/02* (2020.01)

(52) U.S. Cl.
  CPC .......... *B60W 10/18* (2013.01); *B60W 10/184* (2013.01); *B60W 10/20* (2013.01); *B60W 50/14* (2013.01); *B62D 6/00* (2013.01); *B62D 15/025* (2013.01); *B62D 15/0255* (2013.01); *G05D 1/0268* (2013.01); *B60T 2201/08* (2013.01); *B60T 2201/083* (2013.01); *B60T 2201/087* (2013.01); *B60T 2260/022* (2013.01); *B60T 2260/06* (2013.01); *B60W 2520/125* (2013.01); *B60W 2710/18* (2013.01); *B60W 2710/20* (2013.01); *B60W 2720/18* (2013.01); *B60Y 2300/82* (2013.01)

(56) References Cited

U.S. PATENT DOCUMENTS

| | | | |
|---|---|---|---|
| 8,355,841 | B2 | 1/2013 | Takahashi et al. |
| 9,193,381 | B2 | 11/2015 | Baer et al. |
| 9,387,852 | B2 | 7/2016 | Meitinger et al. |
| 9,567,008 | B2 | 2/2017 | Eichhorn |
| 2002/0007239 | A1* | 1/2002 | Matsumoto ............... B62D 1/28 701/41 |
| 2003/0191573 | A1 | 10/2003 | Beyer et al. |
| 2007/0299580 | A1 | 12/2007 | Lin et al. |
| 2009/0010482 | A1* | 1/2009 | Nishida ..................... G06T 7/12 382/100 |
| 2009/0093930 | A1 | 4/2009 | Hatano et al. |
| 2011/0022267 | A1* | 1/2011 | Murphy ................ B60W 30/04 701/38 |
| 2013/0041545 | A1 | 2/2013 | Bär et al. |
| 2013/0218414 | A1 | 8/2013 | Meitinger et al. |

FOREIGN PATENT DOCUMENTS

| | | |
|---|---|---|
| DE | 10025492 A1 | 7/2004 |
| DE | 10357922 A1 | 7/2004 |
| DE | 102007029427 A1 | 1/2008 |
| DE | 102008004894 AI | 1/2009 |
| DE | 102007037645 A1 | 2/2009 |
| DE | 102010046317 A1 | 3/2012 |
| DE | 102013208206 A1 | 11/2014 |
| DE | 102013017209 AI | 4/2015 |
| EP | 1046571 A2 | 10/2000 |
| EP | 1275573 A2 | 1/2003 |
| EP | 1412217 B2 | 1/2008 |
| EP | 2487056 A1 | 8/2012 |
| WO | WO 2005005177 A2 | 1/2005 |

OTHER PUBLICATIONS

English-language Abstract of German Patent Publication No. DE 10142366 A1; 1 page.
English-language Abstract of German Patent Publication No. DE 10357922 A1; 2 pages.
English-language Abstract of German Patent Publication No. DE 102007037645 A1; 1 page.
English-language Abstract of German Patent Publication No. DE 102013017209 A1; 6 pages.
English-language Abstract of European Patent Publication No. EP 1046571 A2; 1 page.
English-language Abstract of International Patent Publication No. WO 2005005177 A2; 2 pages.
International Preliminary Report on Examination, directed to related International Patent Application No. PCT/EP2016/000438, dated Nov. 23, 2017; 7 pages.

* cited by examiner

METHOD FOR OPERATING A TRANSVERSAL GUIDANCE SYSTEM OF A MOTOR VEHICLE, AND MOTOR VEHICLE

TECHNICAL FIELD

The present invention relates to a method for operating a transversal guidance system adapted for performing automatic transversal guidance interventions on a motor vehicle, which has a first transversal guidance actuator controlled by a steering handle, in particular a steering wheel, to be operated on the driver side, and to a motor vehicle system adapted for setting a target roll angle of the motor vehicle. The invention also relates to a motor vehicle.

BACKGROUND

The known motor vehicles may be steered by the driver in order to perform a transversal guidance, wherein, usually, a steering handle, in particular a steering wheel, accessible on the driver side, is used. The steering wheel may be directly mechanically coupled to a transversal guidance actuator, in general a front axle steering; however, it has also been proposed to measure the inputs to the steering handle by means of a steering sensor and to convert these inputs into corresponding control signals for the transversal guidance actuator (keyword: "steer-by-wire"). The position of the steering wheel notifies the driver regarding the strength and direction of the current steering.

In the context of a progressive automation, vehicle systems have already been proposed that are completely or partially adapted for an automatic guidance of the motor vehicle. If such a vehicle system is possibly also adapted for the transversal guidance of the motor vehicle, i.e., if the vehicle system may also automatically perform transversal guidance interventions, it is also indicated as a transversal guidance system. Transversal guidance systems are known, for example, that perform transversal guidance interventions when the motor vehicle is at risk of leaving the current driving lane. The transversal guidance systems with central lane tracking try to guide the motor vehicle centrally along the currently followed driving lane. Moreover, transversal guidance systems may also be obviously part of a vehicle guidance system that is at least partially autonomous.

In general, transversal guidance systems evaluate sensor data of the motor vehicle, in particular sensor data of at least one environment sensor, and/or determine properties of the driving lane based on digital map data of a navigation system of a motor vehicle, considering a current position. Central lane transversal guidance systems may, for example, evaluate data of a camera that is directed onto an area in front of the motor vehicle, in order to determine the further driving lane path and/or the transversal position of the motor vehicle on the driving lane and correspondingly determine and perform transversal guidance interventions.

Various variants are known in the art that concretely implement transversal guidance interventions. It is possible, for example, that the transversal guidance intervention is implemented directly through the steering handle, in particular the steering wheel. Motors may be used, for example, that rotate the steering wheel. After these have been coupled to the transversal guidance actuator, the corresponding transversal guidance takes place. The transversal guidance intervention may however also be performed by means of a transversal guidance actuator, which provides the driver indirectly with feedback about the strength and direction of the intervention, for example, when a braking system is used for the lane guidance that is adapted for unequally strong braking interventions on opposite sides of the motor vehicle. Subsequently, a haptic feedback provides information about the requested steering action in case of unilateral braking intervention. Finally, it has already been proposed to perform an intervention onto a transversal guidance actuator, which does not provide any information regarding direction and/or strength of the transversal guidance intervention to the driver. This is particularly used when only smaller steering corrections are performed.

The systems for driver assistance fundamentally require a (permanently usable) intuitive display regarding the strength and direction of the intervention, at least for stronger transversal guidance operations, since the intervention is otherwise surprising to the driver and thus unacceptable. The only medium suitable for providing a permanent indication of the driving direction is currently the steering handle, in particular the steering wheel, since, for instance, a haptic channel, which is provided by braking interventions, is only suitable for brief lane deviation warnings and the like, but not for lane tracking.

The different known variants have some disadvantages. A transversal guidance intervention without a coordinated notification is accepted, for example, only in case of minimal steering movements. If, for example, the transversal guidance system were to steer around a curve, without correspondingly moving the steering handle, so that, for instance, the steering wheel remains in the neutral position, then the driver would not accept this due to the inconsistency between the position of the steering handle and the yaw rate.

In case of a transversal guidance intervention by means of a unilateral braking intervention, for example, there is the problem that the braking or deceleration must first be interpreted as a steering. In many motor vehicles, braking jolts occur, which have to be interpreted as a crash warning or similar, which, in case of additional use as a (short) steering notification, may cause confusion in the driver.

But also, the notification of a transversal guidance intervention on the steering handle, in particular the steering wheel, has problems. If the transversal guidance system sets its information that a transversal guidance intervention takes place via the steering handle, and/or if the steering handle itself is used to perform the intervention, this intervention overlaps, in an undefined and not reproducible way, with the existing desire for a nominal course by the driver, who affirmatively uses the steering wheel for implementing the driver's own driving desires. In this way, the control sovereignty of the driver is influenced, so that the transversal guidance intervention may be perceived by the driver as patronizing. Moreover, confusion may be caused regarding the responsibility for the vehicle guidance. For example, it may be unclear whether the transversal guidance system should take over the transversal guidance or the entire vehicle control, or whether only a recommendation should be produced. The driving direction is determined by an undefined mixed behavior; moreover, the use of the steering handle for feedback regarding a performed transversal guidance intervention disturbs the relationship between the steering torque and the steering angle, so that an inconsistent steering behavior is caused.

BRIEF DESCRIPTION OF THE DRAWINGS/FIGURES

DETAILED DESCRIPTION

Figure 1:
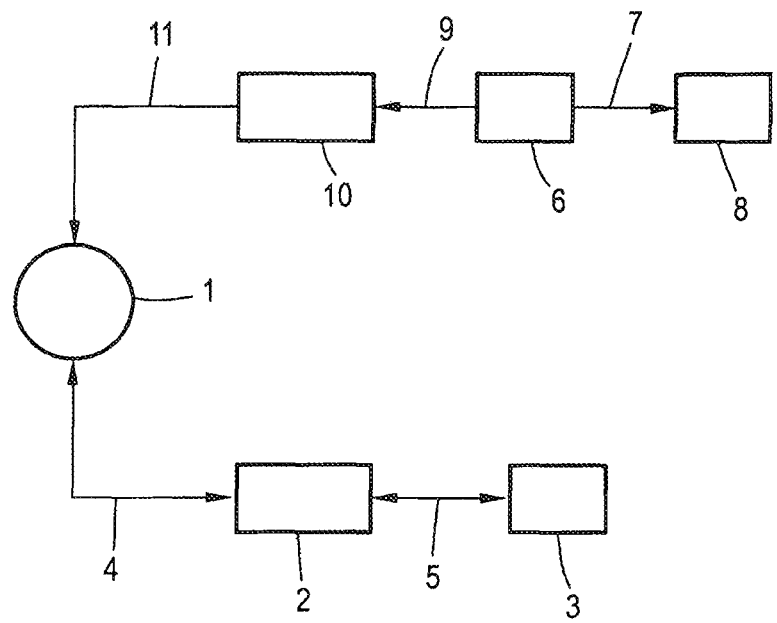
FIG. 1 illustrates a schematic representation of the inventive method.

The object of the invention is thus to provide an improved possible implementation of transversal guidance interventions which do not patronize and/or confuse the driver and to provide the driver with information regarding transversal guidance interventions.

In order to achieve this object, in a method for performing a transversal guidance intervention of above said type, according to the invention, a second transversal guidance actuator not acting on the steering handle is used, and a display roll angle of the motor vehicle, which depends on at least one intervention parameter describing the transversal guidance intervention, is used to notify the driver of the transversal intervention, instead of influencing the steering handle.

According to the invention, it is thus proposed that two separate complete channels (actuator and display) are formed for the transversal guidance: the first channel with the steering handle, in particular the steering wheel, and the first transversal guidance actuator; and the second channel with the driving system and the second transversal guidance actuator. Both channels are thus independent from each other, at least with reference to the display, ideally also to the actuator. The transversal guidance system does not therefore engage the transversal guidance through the steering handle, but uses a transversal guidance actuator which cannot be sensed on the steering handle. The steering handle is also not used for displaying strength and direction of the transversal guidance intervention, while instead the direction and strength of the transversal guidance intervention are indicated to the driver by means of the display of a roll angle of the motor vehicle chassis. The control over the steering handle, and thus also over the first channel, remains exclusively with the driver.

Thus, it is possible for the driver to completely separate the transversal guidance by the driver from the transversal guidance by the transversal guidance system, since the transversal guidance system uses transversal guidance actuators, which are not sensed on the steering handle, i.e., they do not influence the steering perception or the steering wheel angle. In order to display the transversal guidance interventions, instead of the notification "steering wheel angle," a roll angle is actively introduced in the motor vehicle and used as a display. The roll angle of the vehicle chassis (and thus also of the motor hood) advantageously corresponds to the direction in which the transversal guidance system controls the motor vehicle. The roll angle is perceived by the driver in a visual and partially haptic/vestibular way. This display of the roll angle is readily accepted by the driver, since it is very intuitive (akin to a flight in an airplane).

As already mentioned, it is important that the steering handle remains unaffected during transversal guidance interventions by the transversal guidance system, i.e., remains in the neutral position or in the position preset by the driver, after the used second transversal guidance intervention remains uncoupled to the steering handle, and the driver is notified through the alternative channel with the display of the "roll angle" or "hood incline relative to road" indication. Thus, no disturbance of the delicate relationship between driver and steering handle takes place. The steering sensation remains consistent. The driver may overlap the transversal guidance intervention as the driver wishes by means of the driver's own channel—the steering handle—without perceiving corrective steering moments. A curve cutting during central lane tracking, for example, may be easily implemented by the transversal guidance system. In general, in central lane tracking, the transversal guidance may keep the steering wheel essentially always in the neutral position. Thus, the further advantage is obtained, that, for example, in case of highly automatic driving of the motor vehicle, it is possible to use the steering handle in another way, for instance, as a support for mobile devices, in particular tablets and similar. Moreover, during vehicle driving, no concerns regarding competence or responsibility arise, since the driver's sovereignty over the steering wheel is unhindered.

Therefore, a clear separation between the potentials and responsibilities during a vehicle transversal guidance is provided. The vehicle guidance is determined by a defined behavior, since no unpredictable mixed reactions on the steering handle take place.

It is to be noted that embodiments may be devised in which, as a second transversal guidance actuator, the first transversal guidance actuator is used, which is decoupled or may be decoupled from the steering handle. If, for instance, a front axle steering is influenced through the steering handle, as is often the case, no mechanical fixed coupling has to be necessarily present between the steering handle and the first transversal guidance actuator, but instead a so-called "steer-by-wire" system may be implemented, which measures actuations of the steering handle and converts them in corresponding control commands for the first transversal guidance actuator. The control commands for the first transversal guidance actuator, however, may originate also from other vehicle systems, and thus also from the transversal guidance system, so that the first transversal guidance actuator may also be used as a second transversal guidance actuator, since no feedback is provided from the transversal guidance actuator to the steering handle. In other cases, embodiments may also be provided, where, instead of "steer-by-wire" systems, in which the first transversal guidance actuator is not fixedly coupled to the steering handle, the first transversal guidance actuator is also used as a second transversal guidance actuator.

Within the scope of the present invention, it is, however, preferred that an additional transversal guidance actuator, different from the first transversal guidance actuator, is used as a second transversal guidance actuator. Then, a decoupling is provided, since a transversal guidance actuator, which cannot be perceived through the steering handle, may be used in a targeted way, such as a rear axle steering system, for example. Neither the steering sensation nor the angle of the steering handle is thus influenced, so that the separate complete channels may act in a completely separated way, with regard to intervention and display notification.

Specifically, a vehicle system for setting the display roll angle can be provided by a first transversal guidance actuator mechanically coupled to a front axle steering system, a second transversal guidance actuator mechanically coupled to a rear axle steering system, a braking system permitting different braking interventions on opposite sides of the motor vehicle, an overlapping steering system, an active lane adjustment system, and/or an active propulsion system. In this context, the present invention thus uses the fact that modern motor vehicles are already provided with a plurality of transversal guidance actuators, for example, the usual power steering, an overlapping steering, a rear axle steering system, the possibility of unilateral braking interventions, the so-called torque vectoring, wherein different torques are transmitted to opposite wheels, a tensioning steering system, an active lane adjustment capability, or even a steering by roll angle introduction. Interventions through some of these transversal guidance actuators, for example, interventions via the rear axle steering system and the like, are not perceived by the driver on the steering handle. Such transversal guidance actuators are in particular suitable as second transversal guidance actuators, according to the above. Active transversal guidance systems may thus use one or more of the transversal guidance actuators as second transversal guidance actuators, in order to implement their transversal guidance intervention. Fundamentally, active drive systems are also already known in the art, wherein these systems may be provided with active stabilizers and/or fully active driving units, which allow the setting of a roll angle independently from the driving situation and which may advantageously be used in the context of the present invention, in order to implement the display system for transversal guidance interventions to be performed automatically.

The required display roll angle, which visually corresponds ultimately to an incline angle of the motor hood with respect to the road, should be selected to be sufficiently large, in order to provide a clear perception by the driver. In the context of the present invention, two special, particularly advantageous embodiments may be envisaged.

A first preferred embodiment of the present invention consists of a display roll angle selected according to a virtual steering angle of the steering handle, which causes the same current transversal guidance effect provided by the transversal guidance intervention, in particular proportional to the virtual steering angle. For each transversal guidance intervention, at every time during the transversal guidance intervention, it may thus be determined which steering angle of the steering handle, in particular of the steering wheel, would be necessary in order to achieve the same transversal guidance effect. This virtual steering angle forms the basis for the display regarding the display roll angle, so that the incline of the motor vehicle caused by the display is in particular proportion to a quasi-steering wheel angle as a virtual steering angle. The display roll angle thus indicates a yaw rate initiated by the transversal guidance system, the value of which is similar to the steering angle of the steering handle, which would cause the same yaw rate in the case of manual driving.

This has the advantage that ultimately a sort of "virtual steering handle rotation" is provided. In fact, the steering handle is also inclined relative to the environment in case of a vehicle incline, so that the driver may peripherally perceive that, for example, the steering wheel, in particular by observing the steering wheel spoke, is, as usual, pointed in the direction of the curve. A consistent relationship between the yaw rate and the perceived steering angle is thus provided. However, no rotation has taken place with respect to the vehicle interior, so that there is no intervention on the steering handle and no influence on the steering sensation.

A second further advantageous embodiment of the present invention consists of the display roll angle selected according to a currently acting transversal force due to the transversal guidance intervention, in particular proportional to the transversal force. In this embodiment, the incline of the motor vehicle is thus determined by the transversal force caused by the transversal guidance intervention of the transversal guidance system, so that the incline may ultimately be understood—in connection with the previously discussed first preferred embodiment—for example, as proportional to a quasi-steering wheel angle multiplied by the actual speed of the motor vehicle.

This embodiment has the particular advantage that the transversal guidance intervention can only be perceived in a purely visual way, since no transversal force is involved. The passengers driving in the vehicle along with the driver thus do not notice the transversal guidance intervention, which is advantageous in particular when the transversal guidance system corrects a driving error in the transversal guidance by the driver. The driving error by the driver thus remains undetected and the driving comfort of the passengers is not negatively impacted by the transversal guidance intervention.

A general advantageous embodiment of the present invention consists of the display roll angle being scaled depending on a preset by the driver. The use of the roll angle as a notification means for transversal guidance interventions thus also has the further advantage that the notification effect may be scaled, so that, in particular, going from a comfortable incline of the vehicle chassis to a clearly perceivable abrupt incline, based on the display roll angle, a multitude of different intensities of the notification may be set, in particular, in a driver-selectable way.

The inventive concept may be used in a variety of transversal guidance systems, such that a lane tracking system, a safety system, and/or a vehicle guidance system used for fully-automatic motor vehicle guidance may be used as a transversal guidance system. In functional terms, the described concept may thus be used, for example, for a lane centering guidance, in active lane-abandoning alerts, in active lane-change warnings, in active lane change assistance, and in avoidance maneuvers, in order to avoid collisions and/or in order to reduce the consequences of collisions. Obviously, the use for highly automated and fully automated motor vehicles may also be envisaged, wherein, even in the case where interventions by the driver are prevented, the steering handle, in particular a steering wheel, may remain in the neutral position, so that, for example, surfaces of the steering handle, such as a steering wheel surface, may be used as a display or similar.

A refinement of the method provides that when a criticality criterion is satisfied, indicating a situation that requires the attention of the driver for a planned transversal guidance intervention by the transversal guidance system, the latter controls the steering handle in order to output an indication signal, which attracts the attention of the driver. This means that in rare exceptional situations, the complete separation of the transversal guidance system from the steering handle may be deactivated, i.e., when a particular critical traffic situation ensues, which requires a particular attention by the driver to monitor the situation. It has been shown that exactly when interventions by the transversal guidance system are not indicated through the steering handle, the steering handle represents an excellent medium for informing the driver about an exceptional situation occurring, which requires the driver's full attention. This holds, in particular, when the steering wheel is very near to the driver and possibly used, as already mentioned, for other tasks, such as support.

Specifically, it may be envisaged, that a deviation of the steering handle is outputted, which indicates the direction of the planned transversal guidance intervention, in particular when this deviation does not influence the first transversal guidance actuator (steer-by-wire). Within this context, the case is also included where the transversal guidance intervention is indicated through the steering handle, alternatively or additionally to the display roll angle. In addition, or as an alternative, the steering wheel signal may be outputted as a vibration and/or oscillation of the steering handle.

In an embodiment, at least one criticality criterion may describe the system approaching a limit of the transversal guidance system that is at least below a threshold value. In particular, when the capacities of the transversal guidance system are almost completely exhausted, an increased level of attention by the driver is appropriate.

The invention also refers to a motor vehicle, which is provided with a first transversal guidance actuator, controlled by a steering handle, in particular a steering wheel, operated by the driver where at least one transversal guidance system is adapted for performing automatic transversal guidance interventions by means of an additional second transversal guidance actuator, which does not act on the steering handle in case of transversal guidance interventions, and for notifying the transversal guidance intervention by setting a display roll angle by means of the vehicle system. The transversal guidance system may in particular have a control device, which is adapted for performing the inventive method. All embodiments regarding the inventive method may be analogously applied to the inventive motor vehicle, which therefore provides the same already mentioned advantages of the inventive method.

Further advantages and details of the present invention may be obtained from the following exemplary embodiments as well as from the drawings. In particular:

FIG. 1 shows a schematic representation of the inventive method, and

Figure 2:
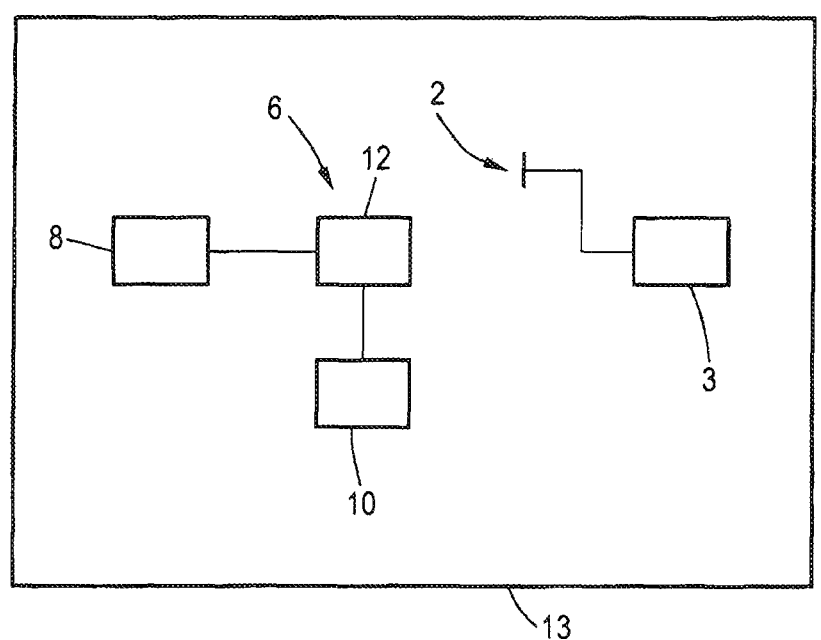
FIG. 2 illustrates a schematic representation of an inventive motor vehicle.

FIG. 2 shows a schematic representation, in principle, of an inventive motor vehicle.

In FIG. 1, a schematic representation of the inventive method, a driver 1 is inside the motor vehicle, in which, as known, the driver 1 may use a steering handle 2, in this case a steering wheel, in order to influence a first transversal guidance actuator 3, in this case a front axle steering system. The arrow 4 pointing in both directions indicates that the steering handle 2 is used as a means for operating the first transversal guidance actuator 3, as well as that it clearly indicates, by means of the steering angle of the steering handle 2, the direction and strength of the transversal guidance intervention caused by actuating the steering handle 2. This is possible since, according to the double arrow 5, in this case, a mechanical coupling between the steering handle 2 and the first transversal guidance actuator 3 is provided.

The steering handle 2 and the first transversal guidance actuator 3 thus form a complete channel for transversal guidance of the motor vehicle, which is completely under the control of the driver 1.

The motor vehicle, in the present case, also has a transversal guidance system 6, which is adapted for performing automatic transversal guidance interventions, for example a driver assistance system for central lane guidance. In order to implement the transversal guidance interventions, a second transversal guidance channel, completely independent from the described first transversal guidance channel, is provided, in which the transversal guidance system 6 initially uses, in order to implement the transversal guidance intervention, according to arrow 7, a second transversal guidance actuator 8 different from the first transversal guidance actuator 3, such as a rear axle steering, for example. This means that the implementation of the transversal guidance interventions does not influence the steering handle 2 in any way.

In order to inform the driver 1 about the transversal guidance intervention by the transversal guidance system 6, according to arrow 9, a vehicle system 10, in this case an active driving system, is controlled in such a way that a display roll angle for the motor vehicle, which indicates the strength and direction of the transversal guidance intervention, is set, and this angle is perceived by the driver 1 according to arrow 11. This means that the steering handle 2 is used neither based on the implementation of the transversal guidance intervention nor by direct control, in order to convey to the driver 1 the strength and direction of the automatic transversal guidance intervention, but through a lateral incline of the chassis of the motor vehicle, which may be perceived and interpreted by the driver 1 in particular by means of the incline of the motor hood with respect to the environment surrounding the motor vehicle.

Due to the fact that the first transversal guidance channel with the steering handle 2 remains completely untouched, the delicate interaction between the driver 1 and this manual transversal guidance channel does not vary. The driver 1 may use it as normal and according to the driver 1's experience, even without feeling patronized. At the same time, however, an extremely intuitive feedback is provided by the display roll angle.

It is to also to be noted, at this point, that embodiments may also be envisaged, in which the first transversal guidance actuator 3 corresponds to the second transversal guidance actuator 8, if the first transversal guidance actuator 3 is decoupled or may be decoupled from the steering handle 2, since the transversal guidance interventions performed by the first transversal guidance actuator 3 do not necessarily cause a feedback to the steering handle 2; in order to get the steering sensation it is however preferred that the first transversal guidance actuator 3 and the second transversal guidance actuator 8 are different from each other.

In order to indicate the direction of the transversal guidance intervention, the motor vehicle is ultimately tilted towards the inside of the curve, i.e., according to the direction of the transversal guidance intervention by a corresponding sign of the display roll angle. In order to intuitively indicate the strength of the transversal guidance intervention via the display roll angle, two possibilities exist. On one hand, the display roll angle may be selected to be proportional to a virtual steering angle of the steering handle 2. This may be readily derived from the known properties of the first transversal guidance channel. Alternatively, it is possible to select the display roll angle to be proportional to the transversal force, which is caused by the transversal guidance intervention.

It is also possible to render the strength of the display regarding the display roll angle to be influenced by the driver, since it may be scaled. This may be accomplished, for example, through a corresponding setting on a human-machine interface.

FIG. 2 shows a schematic representation of an inventive motor vehicle 13. This vehicle is provided with a steering handle 2 formed by a steering wheel, coupled with the first transversal guidance actuator 3, which is provided as a front axle steering system.

The motor vehicle 13 is provided, completely independently from the above, with a transversal guidance system 6, in this case a driver assistance system for lane central tracking, the operation of which is controlled by a control device 12, which is adapted for performing the inventive method. To this end, the control device 12 is connected to the second transversal guidance actuator 8 configured as a rear axle steering system, and the vehicle system 10, which is configured as an active driving system.

Finally, it is also to be noted that embodiments may be envisaged, which, in situations requiring the attention of the driver, may differ from a strict separation of formed channels. Exactly because of the fact that usually transversal guidance interventions by the transversal guidance system 6 are not indicated on the steering handle 2, these embodiments are particularly suitable for indicating critical situations. Since transversal guidance interventions are usually pre-planned (pre-control), for example based on predictive data regarding the track profile, transversal guidance interventions may also be judged in an early stage, on whether the attention of the driver is required, for example, because the transversal guidance system 6 is approaching the limits of the system. This can be described by at least one criticality criterion. If this criterion is fulfilled, then the transversal guidance system 6 outputs an indication signal regarding the steering handle 2.

The invention claimed is:

1. A method for operating a transversal guidance system of a motor vehicle, that is adapted to perform an automatic transversal guidance intervention through two independent channels, comprising:
   controlling, in a first channel, a first transversal guidance actuator by means of a steering handle operated by a driver; and
   controlling, in a second channel, a second transversal guidance actuator, which does not have an effect on the steering handle, to perform the transversal guidance intervention, comprising:
      setting a target roll angle by a vehicle system;
      setting a display roll angle of the motor vehicle that depends on at least one intervention parameter describing at least one of a direction or a magnitude of the transversal guidance intervention based on the target roll angle set by the vehicle system; and
      notifying the driver of the transversal guidance intervention by the display roll angle.

2. The method of claim 1, further comprising:
   using the first transversal guidance actuator, which is or may be separated from the steering handle, as the second transversal guidance actuator.

3. The method of claim 1, further comprising:
   using an additional transversal guidance actuator as the second transversal guidance actuator, which is different from the first transversal guidance actuator.

4. The method of claim 1, further comprising:
   using, as the first transversal guidance actuator, a front axle steering system coupled with the steering handle;
   using, as the second transversal guidance actuator, a rear axle steering system, a braking system allowing different braking interventions on opposite sides of the motor vehicle, an overlap steering system, or an active lane adjusting system; or
   using, as the vehicle system, an active driving system for setting the display roll angle.

5. The method of claim 1, wherein the display roll angle is selected according to a virtual steering angle of the steering handle leading to the same transversal guidance effect caused by the transversal guidance intervention.

6. The method of claim 1, wherein the display roll angle is selected according to a currently acting transversal force due to the transversal guidance intervention.

7. The method of claim 1, wherein the display roll angle is scaled according to a presetting by the driver.

8. The method of claim 1, further comprising:
   using, as the transversal guidance system, a lane tracking system, a safety system, or a vehicle guidance system adapted for full automatic guidance of the vehicle.

9. The method of claim 1, further comprising:
   assessing, by the transversal guidance system, whether a criticality criterion is met, wherein if the criticality criterion indicates that a situation requires attention of the driver for the transversal guidance intervention planned by the transversal guidance system, further comprising:
   controlling, by the transversal guidance system, the steering handle to output an indication signal that attracts the attention of the driver,
   wherein the indication signal comprises a vibration or an oscillation of the steering handle.

10. The method of claim 9, wherein the criticality criterion describes the transversal guidance system approaching a system limit of the transversal guidance system while dropping below at least one threshold value.

11. A motor vehicle, comprising:
   a first transversal guidance actuator;
   a second transversal guidance actuator;
   a steering handle;
   a transversal guidance system; and
   a vehicle system, configured to:
   control the first transversal guidance actuator by means of the steering handle operated by a driver; and
   control the second transversal guidance actuator, which does not have an effect on the steering handle, to perform the transversal guidance intervention, comprising:
      setting a target roll angle by the vehicle system;
      setting a display roll angle of the motor vehicle that depends on at least one intervention parameter describing at least one of a direction or a magnitude of the transversal guidance intervention based on the target roll angle set by the vehicle system; and
      notifying the driver of the transversal guidance intervention by the display roll angle.

12. The motor vehicle of claim 11, further comprising:
   a control device of the transversal guidance system configured to:
   use the first transversal guidance actuator, which is or may be separated from the steering handle, as the second transversal guidance actuator.

13. The motor vehicle of claim 11, further comprising:
   a control device of the transversal guidance system configured to:
   use an additional transversal guidance actuator as the second transversal guidance actuator, which is different from the first transversal guidance actuator.

14. The motor vehicle of claim 11, further comprising:
   using, as the first transversal guidance actuator, a front axle steering system coupled with the steering handle;
   using, as the second transversal guidance actuator, a rear axle steering system, a braking system allowing different braking interventions on opposite sides of the motor vehicle, an overlap steering system, or an active lane adjusting system; or
   using, as the vehicle system, an active driving system for setting the display roll angle.

15. The motor vehicle of claim 11, wherein the display roll angle is selected according to a virtual steering angle of the steering handle leading to the same transversal guidance effect caused by the transversal guidance intervention.

16. The motor vehicle of claim 11, wherein the display roll angle is selected according to a currently acting transversal force due to the transversal guidance intervention.

17. The motor vehicle of claim 11, wherein the display roll angle is scaled according to a presetting by the driver.

18. The motor vehicle of claim 11, further comprising: using, as the transversal guidance system, a lane tracking system, a safety system, or a vehicle guidance system adapted for full automatic guidance of the vehicle.

19. The motor vehicle of claim 11, further comprising:
assessing, by the transversal guidance system, whether a criticality criterion is met, wherein if the criticality criterion indicates that a situation requires the attention of the driver for the transversal guidance intervention planned by the transversal guidance system, further comprising:
controlling, by the transversal guidance system, the steering handle to output an indication signal that attracts the attention of the driver,
wherein the indication signal comprises a vibration or an oscillation of the steering handle.

20. The motor vehicle of claim 19, wherein the criticality criterion describes the transversal guidance system approaching a system limit of the transversal guidance system while dropping below at least one threshold value.

* * * * *